(12) United States Patent
Perisic et al.

(10) Patent No.: US 8,966,434 B2
(45) Date of Patent: Feb. 24, 2015

(54) REPOSITORY BASED DEVELOPMENT USING PROJECT DEVELOPMENT TOOLS IN ENTERPRISE MANAGEMENT ENVIRONMENT

(75) Inventors: Marko Perisic, Birkeroed (DK); Ramakanthachary Gottumukkala, Sammamish, WA (US); Vincent Nicolas, Vaeloese (DK); Jakob Steen Hansen, Issaquah, WA (US); Kalman Beres, Budapest (HU)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 13/153,846

(22) Filed: Jun. 6, 2011

(65) Prior Publication Data

US 2012/0311522 A1  Dec. 6, 2012

(51) Int. Cl.
*G06F 9/44* (2006.01)
*G06F 9/445* (2006.01)

(52) U.S. Cl.
CPC .... *G06F 8/71* (2013.01); *G06F 8/61* (2013.01)
USPC ........................................................ 717/102

(58) Field of Classification Search
CPC .................................... G06F 8/61; G06F 8/71
USPC ........................................................ 717/102
See application file for complete search history.

(56) References Cited

U.S. PATENT DOCUMENTS

| | | | |
|---|---|---|---|
| 6,854,088 B2 * | 2/2005 | Massengale et al. | 715/764 |
| 7,131,120 B2 * | 10/2006 | Veselov | 717/164 |
| 7,437,739 B1 * | 10/2008 | Hsieh et al. | 719/328 |
| 7,516,167 B2 | 4/2009 | Selman et al. | |
| 7,577,911 B2 * | 8/2009 | Oswalt | 715/744 |
| 7,711,708 B2 | 5/2010 | Bergstraesser et al. | |
| 7,886,035 B2 | 2/2011 | Stark et al. | |
| 8,015,149 B1 * | 9/2011 | Anastasopoulos et al. | 707/610 |
| 2001/0044857 A1 * | 11/2001 | Pham et al. | 709/327 |
| 2005/0216489 A1 | 9/2005 | Young et al. | |
| 2007/0240145 A1 * | 10/2007 | Saroj et al. | 717/168 |
| 2008/0086495 A1 * | 4/2008 | Kiziltunc et al. | 707/102 |
| 2008/0201707 A1 * | 8/2008 | Lavery et al. | 717/178 |

OTHER PUBLICATIONS

"ASP.NET Web Application Project Deployment Overview", Retrieved at <<http://msdn.microsoft.com/en-us/library/dd394698.aspx>>, Retrieved Date: Mar. 8, 2011, pp. 15.
Bhardwaj, Anutthara, "Building ASP.NET projects with Team Build", Retrieved at<<http://msdn.microsoft.com/en-us/library/aa718894.aspx>>, Retrieved Date: Mar. 8, 2011, pp. 3.
"How to: Use Managed Code to Add a Custom Command to the Ribbon", Retrieved at<<http://msdn.microsoft.com/en-us/library/ff641914.aspx>>, May 2010, pp. 10.

(Continued)

*Primary Examiner* — Wei Zhen
*Assistant Examiner* — Lanny Ung
(74) *Attorney, Agent, or Firm* — Damon Rieth; Jim Ross; Micky Minhas

(57) ABSTRACT

An integrated system for seamless code development using Application Development Environments (ADEs) for Enterprise Management Application (EMA) environments utilizing EMA repositories is provided. Projects are stored in the EMA repository and EMA components and other repository based projects made aware of each other. The repository based projects may be shipped as part of the respository and automatically deployed from the repository.

20 Claims, 7 Drawing Sheets

(56) References Cited

OTHER PUBLICATIONS

"Repository-Centric Enterprise Architecture", Retrieved at<<http://www.spectrum-systems.com/white_papers/wp_repository_centric_ea.pdf>>, Retrieved Date: Mar. 8, 2011, pp. 5.

"Version Control System", Retrieved at<<http://msdn.microsoft.com/en-us/library/aa639568.aspx>>, 2009, pp. 2.

* cited by examiner

REPOSITORY BASED DEVELOPMENT USING PROJECT DEVELOPMENT TOOLS IN ENTERPRISE MANAGEMENT ENVIRONMENT

BACKGROUND

Enterprise Management Applications (EMA) and other similar management applications may provide business solutions for creating reports by providing project templates and modeling tools. The applications may operate over a Web-based framework that allows for users to interact with data in the Enterprise Management Application through a Web browser. A user may create new content for the EMA, and also modify existing content. In an Enterprise Management Application, program development and modification may typically be accomplished using the application's own integrated development environment, which resides in the EMA. Most additions and changes can be made with resources in an application server (AS) contained in the EMA and using the Integrated Development Environment (IDE). More advanced applications and modifications can be created by using separate Application Development Environment (ADE) that are specifically designed for providing a platform for programming of projects and applications. Some Enterprise Management Applications may be configured to allow for some development and modification of programs, projects, and applications using separate ADEs, however, the applications are not typically integrated together or synchronized, and programming and development for EMAs in separate Application Development Environments may consequentially be cumbersome and inconvenient.

As EMA designers and partners develop more code for the EMA, one challenge they face is tooling support for a simple, effective, consistent, and long term sustainable solution for shipping and customizing code. Traditionally, code for EMA is shipped separate of the EMA applications, and the EMA applications are typically not aware of the artifacts. As a result, the paradigms of customization, shipping, packaging, source control, deployment, and other EMA-specific items do not apply to code artifacts, which are an essential part of the EMA applications. Furthermore, ADEs provide a wide range of capabilities and tools for code development, but code is not developed using an ADE in an integrated manner within an EMA environment.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an integrated system providing seamless code development using Application Development Environments (ADEs) for Enterprise Management Application (EMA) environments that enables development on artifacts stored in a repository rather than in files. According to some embodiments, imperative code can be productively integrated in a model driven, repository centric environment storing projects in an EMA repository and making EMA components aware of the projects. The repository based projects may be shipped as part of the respository and automatically deployed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
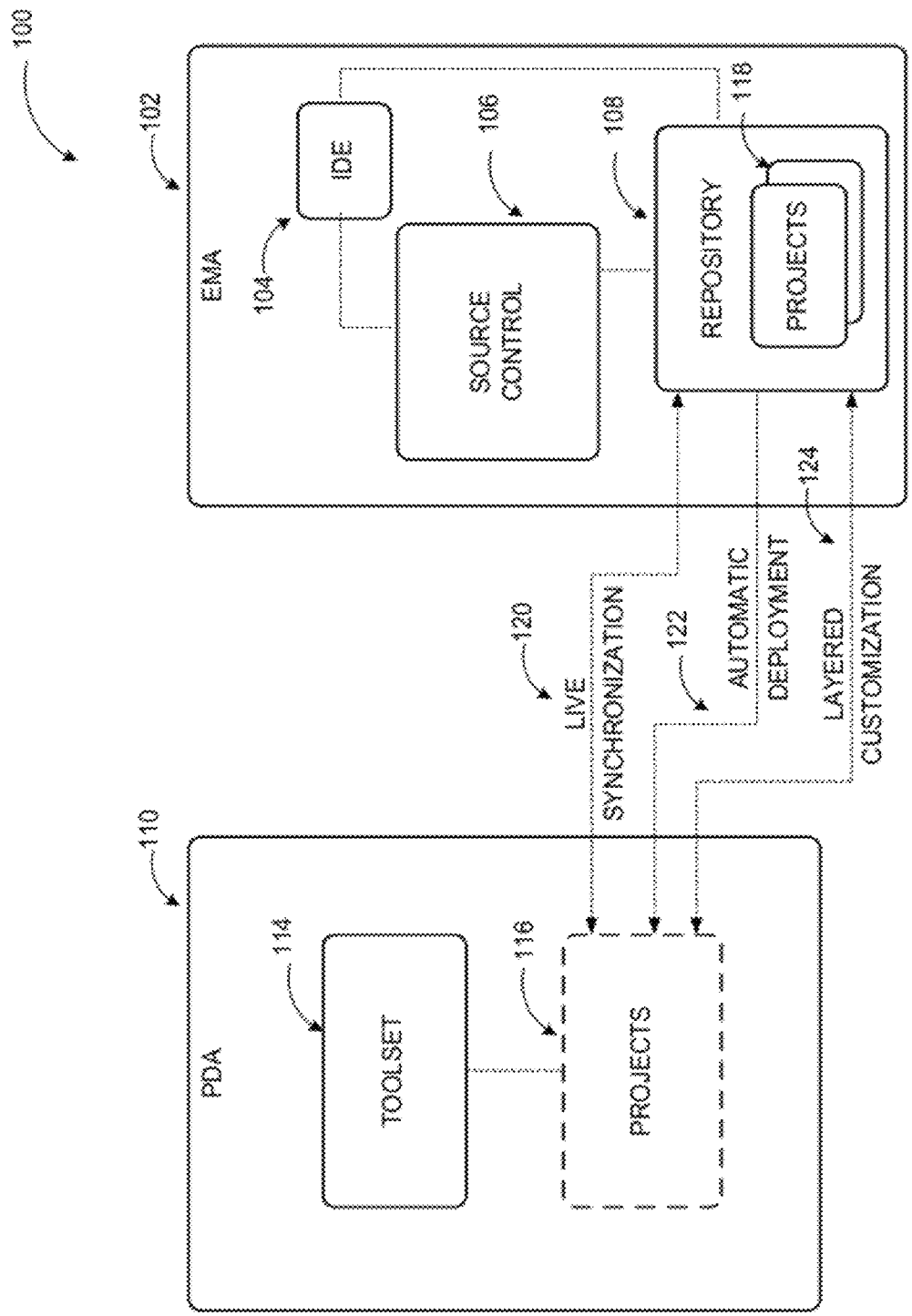
FIG. 1 demonstrates an example embodiment of an integrated system for seamless code development in EMA environments according to embodiments.

As briefly described above, imperative code can be productively integrated in a model driven, repository centric environment storing projects in an EMA repository and making EMA components aware of the projects. The following detailed description is therefore not to be taken in a limiting sense, and the scope of the present invention is defined by the appended claims and their equivalents.

While the embodiments will be described in the general context of program modules that execute in conjunction with an application program that runs on an operating system on a server or similar computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing repository based code development. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

In an Enterprise Management Application (EMA) 102, program development and modification may typically be accomplished using the application's own integrated development environment, which resides in the EMA 102. Most additions and changes can be made with resources in an application server (AS) and using the Integrated Development Environment (IDE) 104. More advanced applications and modifications can be created by using separate Application Development Environments (ADEs) 110 that are specifically designed for allowing programming of projects and applications. Some Enterprise Management Applications may be configured to allow for some development and modification of programs, projects, and applications using separate ADE's, however the applications are not typically integrated together, and programming and development in separate ADEs may be cumbersome and inconvenient. In order to program for a separate application using an ADE, program language compatible with the EMA may be copied by a user from the command line in the EMA and pasted into a command window in the ADE for design and modification of EMA projects.

Referring to FIG. 1, diagram 100 demonstrates an example embodiment of an integrated system for seamless code development in EMA environments. The integrated system may provide programming capability for Enterprise Management Applications (EMA) 102 in conjunction with a separate Application Development Environment (ADE) 110. In a system according to embodiments, the development experience in the EMA may be aligned with the development experience of using the ADE toolset 114. An integrated system may deliver the capability of developing and controlling repository based projects 118 in EMA 102 working from the ADE infrastructure. Using ADE toolset 114, a user may create or edit a project (116) that is stored in repository 108 of EMA 102 and may create and edit objects within the project. A project, as used herein, is as a collection of artifacts, typically specifying imperative code, metadata and control of an application or library.

EMA 102 may provide programmatic libraries and other tools and objects, which may be stored in source control 106, for development within the EMA environment. EMA programmatic libraries and objects stored in the source control 106 may be able to be used in the ADE 110 by integrating the ADE toolset 114 with the EMA toolset through synchronization of the ADE toolset 114 with the EMA library. Repository based projects may be integrated with ADE 110 by live synchronization 120 with the ADE. The projects 118 may be automatically deployed (122) from the repository 108. Furthermore, layered customization of the projects may be enabled (124).

The example systems in FIG. 1 have been described with specific servers, client devices, applications, and interactions. Embodiments are not limited to systems according to these example configurations. A system providing repository based code development in an Enterprise Management Application environment using an Application Development Environment infrastructure may be implemented in configurations employing fewer or additional components and performing other tasks. Furthermore, specific protocols and/or interfaces may be implemented in a similar manner using the principles described herein.

Figure 2:
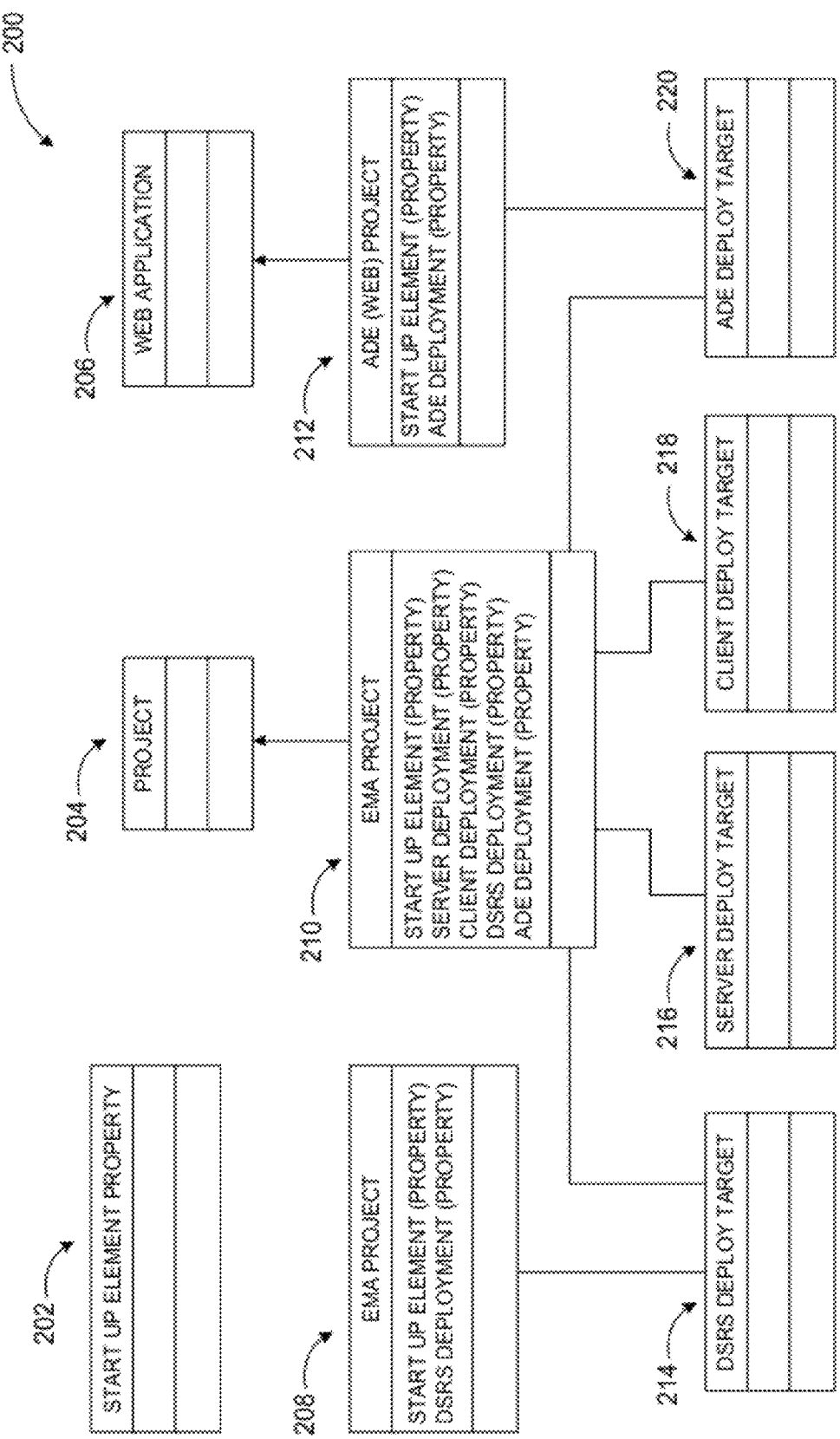
FIG. 2 demonstrates an example data model for a system enabling repository based code development in an EMA environment.

FIG. 2 demonstrates an example data model for a system enabling repository based project development in an EMA environment. The example data model shown in diagram 200 includes startup element property 202. According to the data model, an EMA project item 208 may include a startup element property and a Database Server Reporting Service (DSRS) deployment property, and deploy to DSRS deployment target 214.

An EMA project item 210, on the other hand, may include a startup element property, a server deployment property, a client deployment property, a DSRS deployment property, and an ADE deployment property. The repository based EMA project item 210 may be deployed to DSRS deployment target 214, server deployment target 216, client deployment target 218, and/or ADE deployment target 220. The EMA project item 210 may report to project 204.

According to the example data model, An ADE (or web application) project item 212 may be provided to a web based ADE 206 and include a startup element property and an ADE deployment property. The ADE project item 212 may be deployed to ADE deployment target 220. Thus, the project based in EMA repository may be deployed to a variety of targets.

Figure 3:
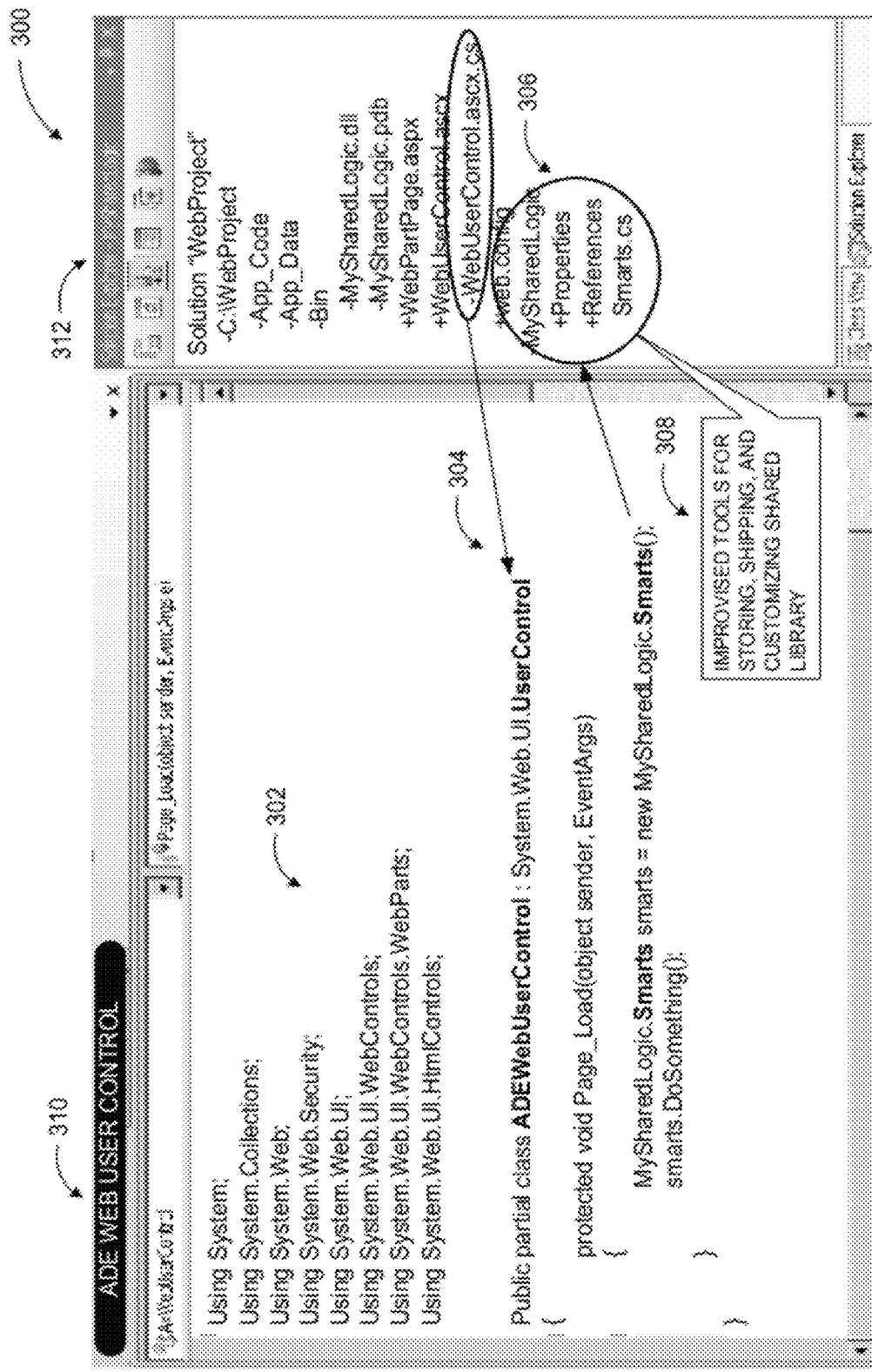
FIG. 3 demonstrates an example user interface of an ADE project using a shared managed library.

FIG. 3 demonstrates an example user interface of an ADE project using a shared managed library. The EMA environment and the ADE may be aligned so that actions occurring in either environment function together creating a seamless project development environment. As shown in example user interface 300, an ADE may be enabled to have a feature for adding a project to an EMA, which may save the project itself under an ADE projects node in the EMA and the code in the unfolded underneath.

Example user interface 300 is shown with an ADE web user control window 310 that displays various elements 302 used by the currently active project. A second window 312 may display nodes from an underlying enterprise management application with a user control node 304 included among the elements of the currently active project. The EMA nodes may also include shared logic with properties, references, and other objects. The active project in the ADE may refer to the shared logic node 306, which may include improvised tools for storing, shipping, and customizing the shared library in the EMA (308).

Figure 4:
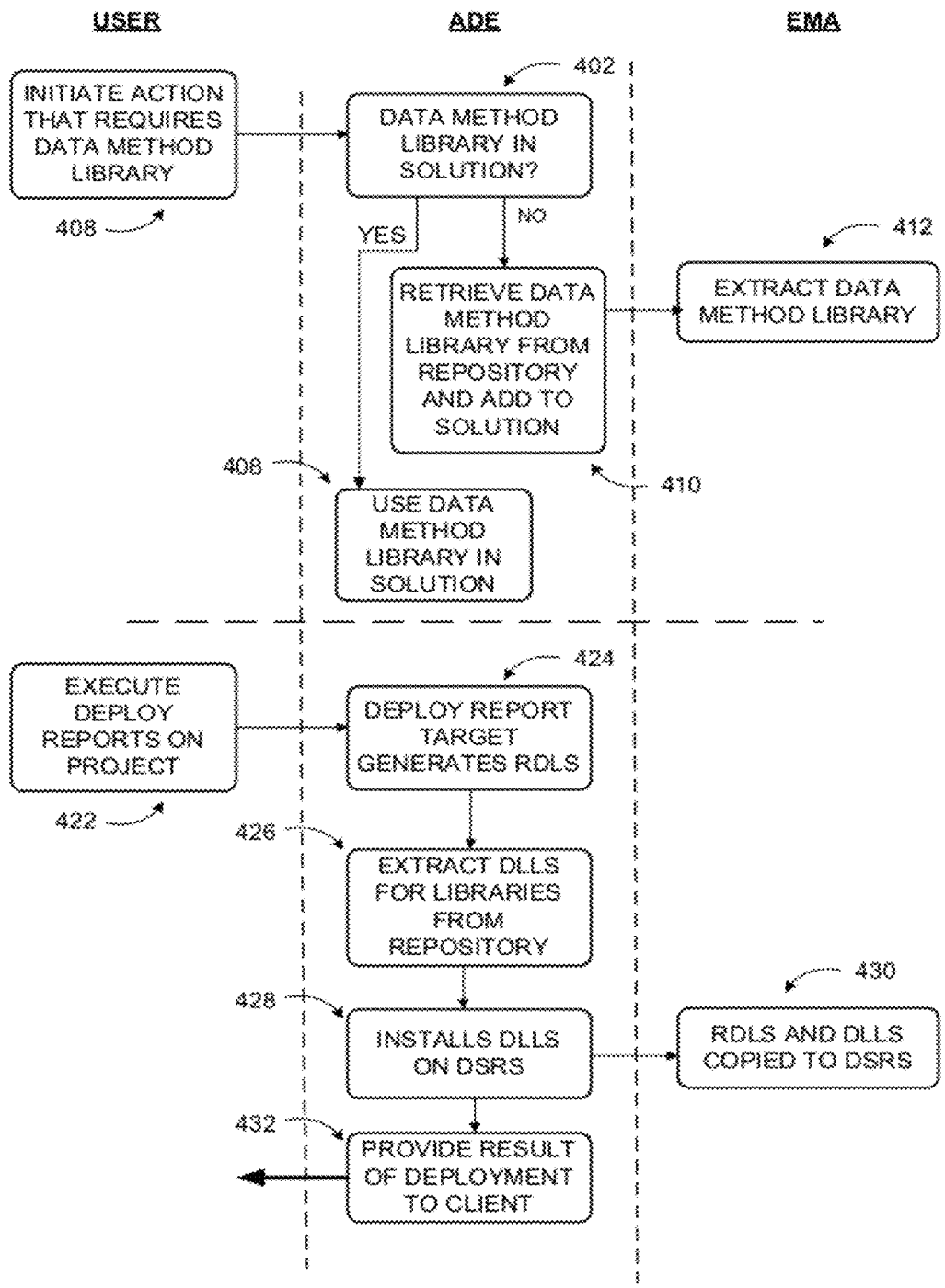
FIG. 4 demonstrates two example scenarios for using a data method at design time and deploying a project in a repository based code development system.

FIG. 4 demonstrates two example scenarios for using a data method at design time and deploying a project in a repository based code development system. In a system according to embodiments, the tools integrated in the ADE for EMA development may provide a variety of functionalities. For example, the ADE integrated tools may allow a user to create an EMA project in the ADE, create one or more user controls in the ADE to add to the shared library (repository) in EMA, modify existing user controls, and customize style sheets in a project. In an example embodiment, a user may use the ADE to create a new user control for an EMA and add to the shared library.

According to the first example scenario in diagram 400, the toolset may be used to create a report (design time), which is used later on within various business intelligence application (run-time). To accomplish this, the user may initiate an action that requires the data method library (408). In response, the ADE may determine whether the needed data method library is among the ADE solutions or not (402). If the library is among the ADE solutions, the ADE may use the data method library (408) in the ADE solutions performing the operations locally. If the library is not among the ADE solutions, however, the ADE may retrieve the data method library from the EMA repository and add to its solutions (410). This may involve and interaction with the EMA, where the EMA extracts the data method library from its repository (412).

According to the second scenario, the user may wish to deploy a project with reports and their respective data method libraries from the ADE. Thus, the user execute a deploy reports on a selected project (422), which causes the deploy report target at the ADE to generate Report Definition Language (RDL) objects (424). RDL is an extensible markup language (XML) application primarily used with Database Server Reporting Services (DSRS). RDL objects may be written using an ADE or created/edited by hand in a text editor. DSRS or other reporting frameworks may use RDL to define charts, graphs, calculations, text, images (through links) and other report objects and render them in a variety of formats.

Following the generation of RDLs, the ADE may extract classes for libraries from EMA repository (426), where the projects are stored. ADE may next install the classes on the DSRS (428), which are copied along with the RDL objects to the DSRS (430) at the EMA. The ADE may then provide the result of the deployment to a client application (432) employed by the user to access the ADE, so the user can see the deployment results immediately. Thus, the project is synchronized live on the ADE and EMA. In addition to using or deploying projects through the ADE in conjunction with the EMA, users may also be enabled to edit, modify, or even rename repository based projects. To accomplish these tasks, a user interface by the ADE, by the EMA, or by a client application (e.g., a web browser) may be provided with relevant user controls and display elements.

The examples in FIG. 1-4 have been described with specific elements, configurations, and scenarios. Embodiments are not limited to systems according to these example configurations. Providing repository based code development in enterprise management environments using an Application Development Environment infrastructure may be implemented in configurations using other types of elements, scenarios, and configurations in a similar manner using the principles described herein.

Figure 5:
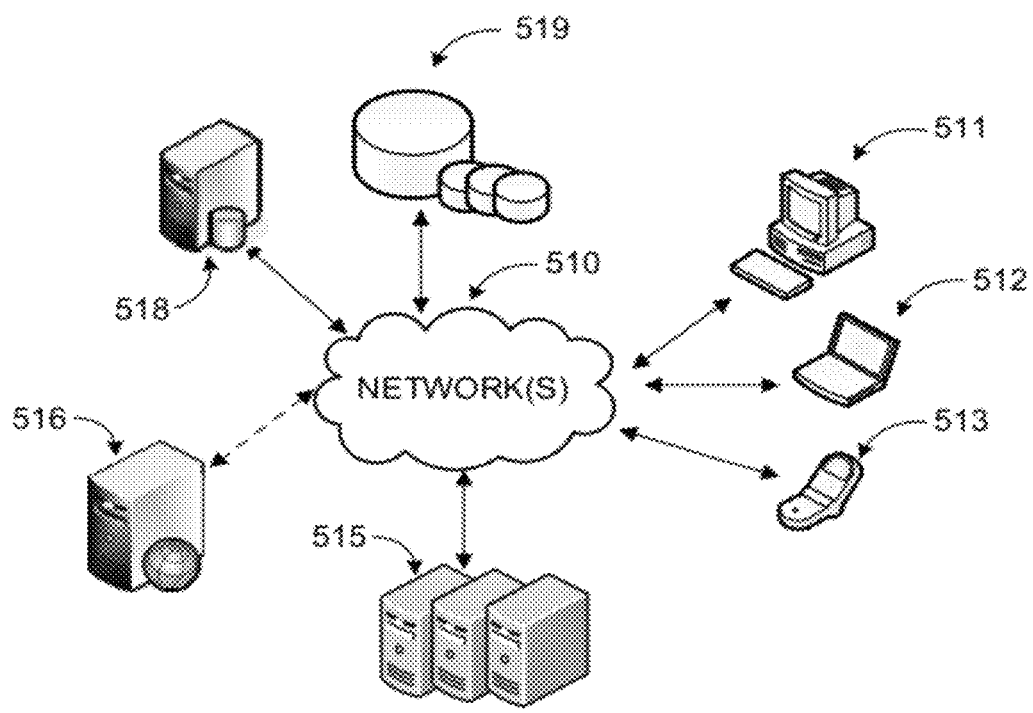
FIG. 5 is a networked environment, where a system according to embodiments may be implemented.

FIG. 5 is an example networked environment, where embodiments may be implemented. A system providing repository based code development in enterprise management environments using an Application Development Environment infrastructure may be implemented via software executed over one or more servers 516 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An ADE executed on one of the servers may facilitate development of code in conjunction with an EMA executed on the same or other servers. Projects may be stored in and deployed from a repository of the EMA to ADEs enabling users to customize the projects in a layered manner. The integrated system may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing repository based code development in enterprise management environments using an Application Development Environment infrastructure. Furthermore, the networked environments discussed in FIG. 5 are for illustration purposes only. Embodiments are not limited to the example applications, modules, or processes.

Figure 6:
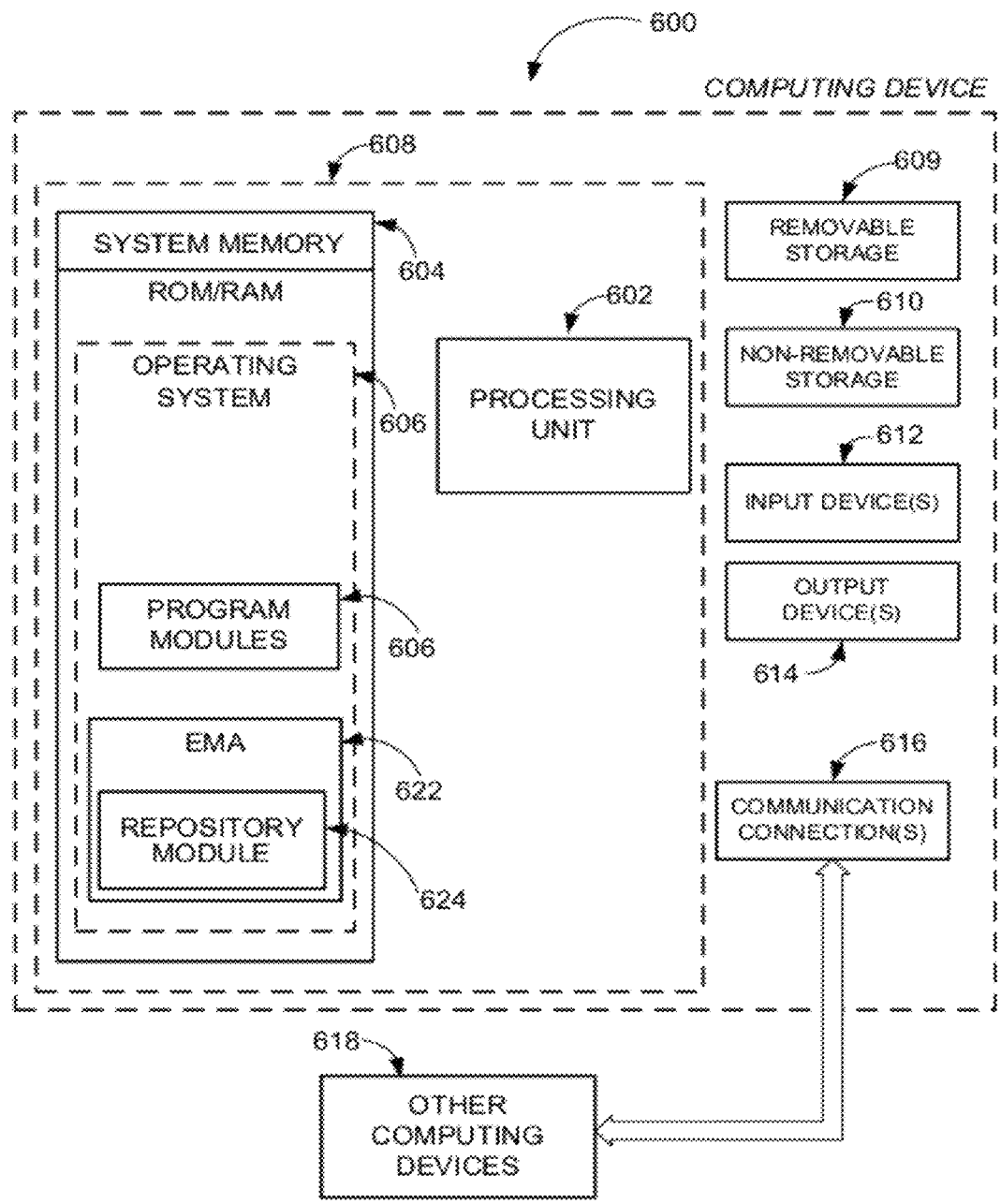
FIG. 6 is a block diagram of an example computing device, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of providing repository based code development in enterprise management environments using an Application Development Environment infrastructure and generating proxy items according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS® operating systems from MICROSOFT CORPORATION of Redmond, Wash. The system memory 604 may also include one or more software applications such as program modules 606, enterprise management application 622, and repository module 624.

Enterprise management application 622 may provide a wide range of services and enable users to create, develop and modify repository based projects using associated ADE infrastructure. Repository module 624 may manage storage, deployment, and layered customization of projects stored in the EMA repository through ADEs. Enterprise management application 622 and repository module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
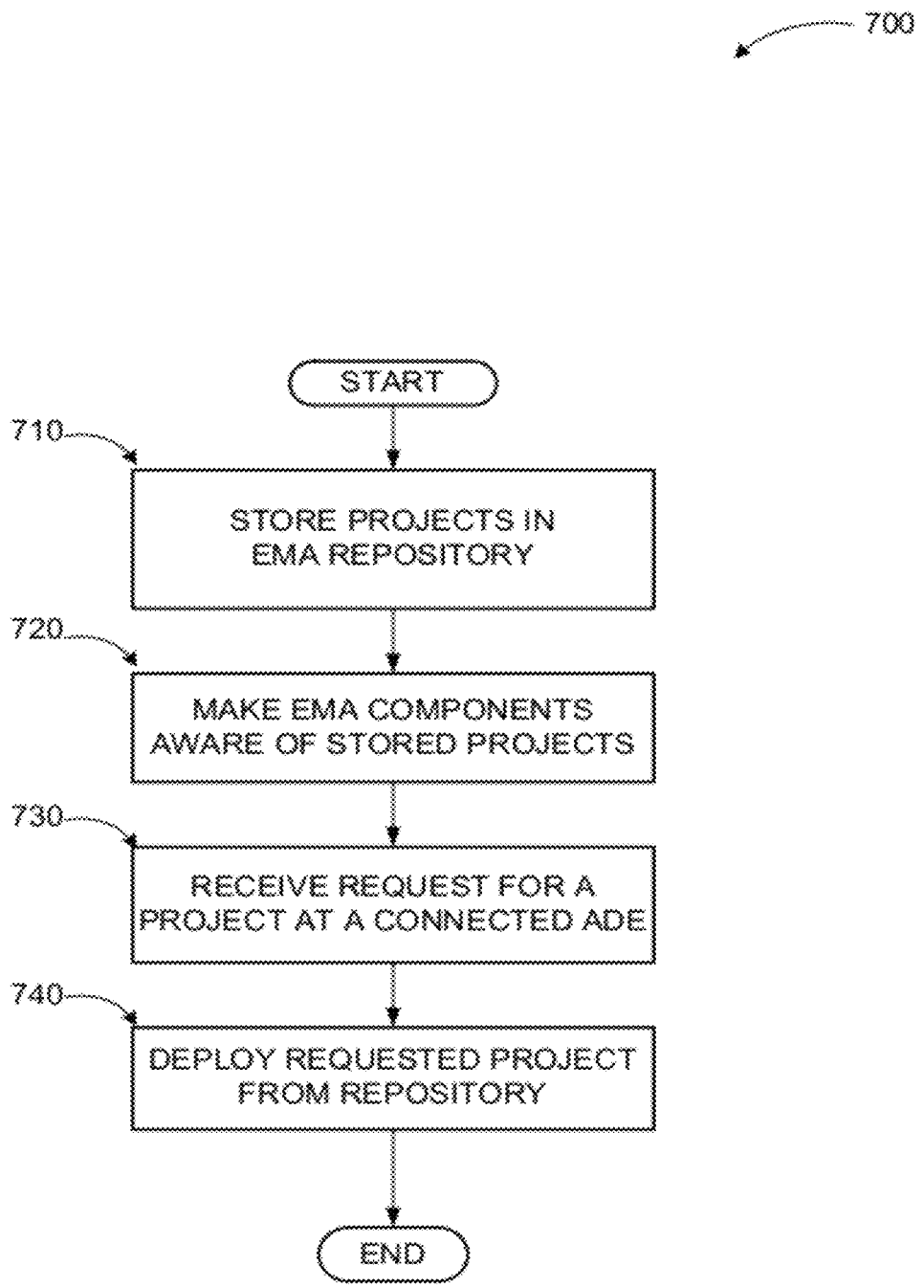
FIG. 7 illustrates a logic flow diagram for a process of using repository based code development according to embodiments.

FIG. 7 illustrates a logic flow diagram for process 700 of providing repository based code development in enterprise management environments using an Application Development Environment infrastructure. Process 700 may be implemented on a server or other computing device.

Process 700 begins with operation 710, where projects are stored in an EMA repository. Other EMA components may be made aware of the repository stored projects to provide additional functionality in a seamless fashion at operation 720. At operation 730, a request may be received from an ADE associated with the EMA for creating a new repository based project, editing an existing project, deploying a created project, etc. The EMA may enable deployment of the project automatically from the repository at operation 740. The EMA may also enable live synchronization of the ADE with the repository such that changes in the repository and the project are in sync. The EMA may also ensure in this repository-centric approach that projects in the repository are aware of each other.

The operations included in process 700 are for illustration purposes. Providing repository based code development in enterprise management environments using an Application Development Environment infrastructure may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing repository-centric project development through an application development environment in an enterprise management environment, the method comprising:
storing one or more projects at an enterprise management application repository;
integrating a toolset provided by an application development environment with another toolset of the enterprise management application through a synchronization of the toolset provided by the application development environment with a programmatic library of the enterprise management application;
upon receiving a request from the application development environment, providing access to a repository based project through the application development environment;
enabling a user to make changes to the project, wherein a graphical user interface of at least one of the application development environment, the enterprise management environment, or a client application includes one or more user control elements and display elements to enable the user to change the project;
automatically synchronizing changes to the project at the application development environment with the repository; and
automatically deploying the project from the repository such that structural and semantic information from projects in the repository are automatically integrated for consumption by other consumers of information from the repository, wherein the project is deployed to one or more of a Database Server Reporting Service (DSRS) deployment target, a server deployment target, a client deployment target, or an application development environment (ADE) deployment target.

2. The method of claim 1, further comprising:
enabling one or more components of the enterprise management application to become aware of the repository based projects.

3. The method of claim 1, further comprising:
enabling the repository based projects to become aware of each other.

4. The method of claim 1, further comprising:
enabling a layered customization of the repository based projects through the application development environment.

5. The method of claim 1, further comprising:
enabling a user to modify one or more existing user control elements for the repository based project using the toolset provided by the application development environment; and
enabling the user to add one or more user control elements for the repository based project using the toolset provided by the application development environment.

6. The method of claim 1, wherein the automatic synchronization ensures that changes at the application development environment and the enterprise management application repository regarding the project are continuously synchronized.

7. The method of claim 1, wherein providing access to the repository based project through the application development environment includes at least one from a set of: editing an existing project and deploying a created project.

8. The method of claim 1, further comprising:
enabling a user to create and deploy a new project through the application development environment by storing the new project in the repository of the enterprise management application.

9. The method of claim 1, further comprising:
shipping one or more projects as part of the repository of the enterprise management application.

10. The method of claim 1, further comprising:
integrating the projects with a source control module of the enterprise management application.

11. The method of claim 1, wherein the repository based project includes one or more reports and one or more data methods associated with each report, and wherein the data methods are stored in a data method library of the repository.

12. The method of claim 1, further comprising:
enabling the application development environment to associate an active project with the repository through the graphical user interface by displaying the repository and its components as nodes on the graphical user interface.

13. A server for providing repository-centric project development through an application development environment in an enterprise management environment, comprising:
a memory storing instructions;
a processor coupled to the memory, the processor executing an enterprise management application, wherein the enterprise management application is configured to:
store one or more projects at a repository of the enterprise management application;
upon receiving a request from the application development environment, enable a user to create and deploy a new project through the application development environment by storing the new project in the repository of the enterprise management application, wherein the new project includes a startup element property and at least one from a set of: a server deployment property, a client deployment property, a Database Server Reporting Service (DSRS) deployment property, and an application development environment (ADE) deployment property to enable an automatic deployment of the new project to one or more of a server deployment target, a client deployment target, a DSRS deployment target, and an ADE deployment target;
upon receiving another request from the application development environment, provide access to a repository based project through the application development environment;
display the repository as nodes on a graphical user interface, wherein the repository based project in the application development environment refers to a shared logic node including a toolset for storing, shipping, and customizing the repository in the enterprise management application;
enable the user to make changes to the project through the graphical user interface that includes one or more user control elements and display elements;
automatically synchronize changes to the project at the application development environment with the repository; and
enable a layered customization of the repository based projects through the application development environment.

14. The server of claim 13, wherein the enterprise management application is further configured to:
enable the application development environment to determine whether an active project is among application development environment solutions;
if elements are among the application development environment solutions, enable the application development environment to perform operations associated with the project locally, else
extract the elements from the enterprise management application repository and enable the application development environment to add the elements to its solutions.

15. The server of claim 13, wherein the enterprise management application is further configured to:
enable the application development environment to generate Report Definition Language (RDL) objects and extract classes from its library in response to deployment action for a project with one or more reports; and
receive the RDL objects and the extracted classes from the application development environment.

16. The server of claim 15, wherein the enterprise management application is further configured to:
install the received RDL objects and classes to a database server reporting service (DSRS) at the enterprise management application repository.

17. The server of claim 15, wherein the enterprise management application is further configured to:
enable the application development environment to deploy the project from the enterprise management application repository; and
provide a deployment result to a requesting user through the graphical user interface.

18. The server of claim 17, wherein the graphical user interface is associated with one of: the application development environment, the enterprise management application, and a client application communicatively connected to the application development environment.

19. A computer-readable hardware memory device with instructions stored thereon for providing repository-centric project development through an application development environment in an enterprise management environment, the instructions comprising:
storing one or more projects at a repository of an enterprise management application;
integrating a toolset provided by an application development environment with another toolset of the enterprise management application through a synchronization of the toolset provided by the application development environment with a programmatic library of the enterprise management application;
upon receiving a request from the application development environment, enabling a user to create and deploy a new project through the application development environment by storing the new project in the repository of the enterprise management application, wherein the new project includes a startup element property and at least one from a set of:

a server deployment property, a client deployment property, a Database Server Reporting Service (DSRS) deployment property, and an application development environment (ADE) deployment property to enable an automatic deployment of the new project to one or more of a server deployment target, a client deployment target, a DSRS deployment target, and an ADE deployment target;

upon receiving another request from the application development environment, providing access to a repository based project through the application development environment;

displaying the repository as nodes on a graphical user interface, wherein the repository based project in the application development environment refers to a shared logic node including a toolset for storing, shipping, and customizing the repository in the enterprise management application;

enabling a user to make changes to the project, wherein the graphical user interface of at least one of the application development environment, the enterprise management environment, or a client application includes one or more user control elements and display elements to enable the user to change the project;

automatically synchronizing changes to the project at the application development environment with the repository such that changes at the application development environment and the enterprise management application repository regarding the project are continuously matched;

and enabling a layered customization of the repository based projects through the application development environment.

20. The computer-readable hardware memory device of claim 19, wherein the instructions further comprise:

enabling one or more components of the enterprise management application and other repository based projects to become aware of the repository based project.

* * * * *